(12) United States Patent
Ishida et al.

(10) Patent No.: US 11,787,237 B2
(45) Date of Patent: Oct. 17, 2023

(54) PNEUMATIC TIRE

(71) Applicant: Sumitomo Rubber Industries, Ltd., Hyogo (JP)

(72) Inventors: Naoki Ishida, Kobe (JP); Takahiro Kawanoue, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 223 days.

(21) Appl. No.: 17/106,005

(22) Filed: Nov. 27, 2020

(65) Prior Publication Data

US 2021/0178831 A1   Jun. 17, 2021

(30) Foreign Application Priority Data

Dec. 11, 2019 (JP) .................................. 2019-223908

(51) Int. Cl.
*B60C 13/00* (2006.01)

(52) U.S. Cl.
CPC .................................. *B60C 13/001* (2013.01)

(58) Field of Classification Search
CPC .................................................... B60C 13/001
See application file for complete search history.

(56) References Cited

U.S. PATENT DOCUMENTS

| | | | | |
|---|---|---|---|---|
| 5,728,242 A | * | 3/1998 | Barrese | ................... B60C 13/02 D12/605 |
| 2012/0199261 A1 | | 8/2012 | Yamakawa | |
| 2012/0273101 A1 | * | 11/2012 | Iwabuchi | .................. B60C 5/00 152/151 |
| 2014/0096883 A1 | | 4/2014 | Miyazaki | |

FOREIGN PATENT DOCUMENTS

| | | | |
|---|---|---|---|
| EP | 2 842 766 A1 | 3/2015 | |
| JP | H11-321243 A | 11/1999 | |
| JP | 2014-136487 A | 7/2014 | |
| JP | 2015042535 A | * 3/2015 | ........... B60C 13/001 |

(Continued)

OTHER PUBLICATIONS

Kaneko, English Machine Translation of JP 2015042537, 2015 (Year: 2015).*

(Continued)

*Primary Examiner* — Justin R Fischer
*Assistant Examiner* — Brendon Charles Darby
(74) *Attorney, Agent, or Firm* — Studebaker & Brackett PC (57) ABSTRACT

A pneumatic tire has a pair of sidewall portion 3. An outer surface of at least one of the pair of sidewall portions 3 includes a decorative region 5 extending in a tire circumferential direction. In the decorative region 5, a plurality of pattern elements 8 are arranged, whereby the decorative region 5 includes a plurality of circumferential pattern lines 6 in each of which the pattern elements 8 are aligned in the tire circumferential direction, and a plurality of radial pattern lines 7 in each of which the pattern elements 8 are aligned in a tire radial direction. In each circumferential pattern line 6, lengths in the tire circumferential direction of the pattern elements 8 are changed in the tire circumferential direction. In each radial pattern line 7, lengths in the tire radial direction of the pattern elements 8 are changed in the tire radial direction.

18 Claims, 7 Drawing Sheets

(56) References Cited

FOREIGN PATENT DOCUMENTS

| | | | | |
|---|---|---|---|---|
| JP | 2015042536 A | * | 3/2015 | ........... B60C 13/001 |
| JP | 2015042537 A | * | 3/2015 | ........... B60C 13/001 |
| WO | 2013/182412 A1 | | 12/2013 | |

OTHER PUBLICATIONS

Kaneko. English Machine Translation of JP 2015042536, 2015 (Year: 2015).*

Kaneko. English Machine Translation of JP 2015042535, 2015 (Year: 2015).*

The extended European search report issued by the European Patent Office dated Mar. 5, 2021, which corresponds to European Patent Application No. 20208856.3-1012 and is related to U.S. Appl. No. 17/106,005.

* cited by examiner

PNEUMATIC TIRE

BACKGROUND OF THE INVENTION

Field of the Invention

The present invention relates to a pneumatic tire.

Description of the Background Art

Generally, each sidewall portion of a pneumatic tire is covered with a rubber having a small thickness. Therefore, projections and recesses called bulges and dents tend to appear locally on the sidewall portion, due to, for example, residual air or joint portions of a carcass that is an internal structure member of the tire. These projections and recesses do not affect the performance of the tire but may cause deterioration of the appearance of the tire.

In order to make the projections and recesses inconspicuous, various pneumatic tires in which decorative patterns are formed on the surfaces of sidewall portions thereof have been proposed (see, for example, Japanese Laid-Open Patent Publication No. 2014-136487).

In recent years, there has been an increasing demand for further improving the appearance of sidewall portions.

The present invention has been made in view of the above-described problem, and a main object of the present invention is to provide a pneumatic tire that can effectively prevent projections and recesses on a sidewall portion thereof from becoming conspicuous.

SUMMARY OF THE INVENTION

The present invention is directed to a pneumatic tire having a pair of sidewall portions, wherein: an outer surface of at least one of the pair of sidewall portions includes a decorative region extending in a tire circumferential direction; in the decorative region, a plurality of pattern elements are arranged at intervals in the tire circumferential direction and a tire radial direction, whereby the decorative region includes a plurality of circumferential pattern lines in each of which the pattern elements are aligned in the tire circumferential direction, and a plurality of radial pattern lines in each of which the pattern elements are aligned in the tire radial direction; in each of the circumferential pattern lines, lengths in the tire circumferential direction of the pattern elements are changed in the tire circumferential direction; and in each of the radial pattern lines, lengths in the tire radial direction of the pattern elements are changed in the tire radial direction.

In the tire according to the present invention, preferably, in at least one of the circumferential pattern lines, the lengths in the tire circumferential direction of the pattern elements adjacent to each other in the tire circumferential direction are different from each other.

In the tire according to the present invention, preferably, in at least one of the circumferential pattern lines, the lengths in the tire circumferential direction of the pattern elements are gradually decreased toward one side in the tire circumferential direction.

In the tire according to the present invention, preferably, in at least one of the circumferential pattern lines, the intervals between the pattern elements are gradually increased toward the one side in the tire circumferential direction.

In the tire according to the present invention, preferably, in at least one of the radial pattern lines, the lengths in the tire radial direction of the pattern elements adjacent to each other in the tire radial direction are different from each other.

In the tire according to the present invention, preferably, in at least one of the radial pattern lines, the lengths in the tire radial direction of the pattern elements are gradually decreased toward one side in the tire radial direction.

In the tire according to the present invention, preferably, in at least one of the radial pattern lines, the intervals between the pattern elements are gradually increased toward the one side in the tire radial direction.

In the tire according to the present invention, preferably, a plurality of linear patterns is formed on surfaces of the pattern elements.

In the tire according to the present invention, preferably, the linear patterns are inclined in the same direction relative to the tire circumferential direction.

In the tire according to the present invention, preferably, in the decorative region, a non-patterned portion having no linear pattern on a surface thereof is formed between the pattern elements adjacent to each other.

In the tire according to the present invention, preferably, the number of the circumferential pattern lines provided is three or more.

In the tire according to the present invention, preferably, each of the radial pattern lines is inclined relative to the tire radial direction.

In the tire according to the present invention, preferably, the pattern elements each have a parallelogram shape in a plan view.

The outer surface of the sidewall portion of the pneumatic tire according to the present invention includes a decorative region extending in the tire circumferential direction. In the decorative region, a plurality of pattern elements is arranged at intervals in the tire circumferential direction and a tire radial direction, whereby the decorative region includes a plurality of circumferential pattern lines in each of which the pattern elements are aligned in the tire circumferential direction, and a plurality of radial pattern lines in each of which the pattern elements are aligned in the tire radial direction. In each of the circumferential pattern lines, the lengths in the tire circumferential direction of the pattern elements are changed in the tire circumferential direction, and in each of the radial pattern lines, the lengths in the tire radial direction of the pattern elements are changed in the tire radial direction.

Each circumferential pattern line changes the degrees of light reflection of the pattern elements in the tire circumferential direction. In addition, each radial pattern line changes the degrees of light reflection of the pattern elements in the tire radial direction. Therefore, the outer surface of the sidewall portion on which the circumferential pattern lines and the radial pattern lines are disposed can reflect light in a complicated manner to effectively prevent projections and recesses from becoming conspicuous.

DESCRIPTION OF THE PREFERRED EMBODIMENTS

Hereinafter, an embodiment of the present invention will be described with reference to the drawings.

Figure 1:
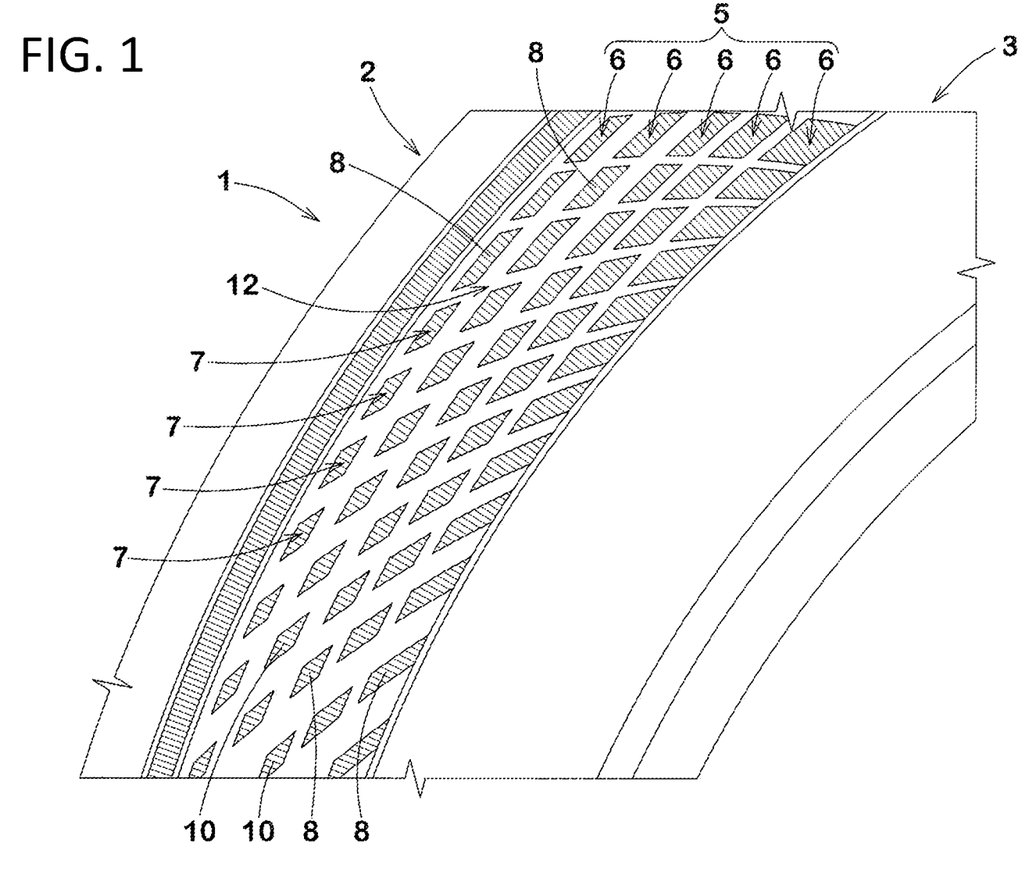
FIG. 1 is an enlarged view of a sidewall portion of a tire according to an embodiment.

FIG. 1 is an enlarged view of a sidewall portion 3 of a pneumatic tire (hereinafter, sometimes referred to simply as "tire") 1 according to the present embodiment. The tire 1 according to the present embodiment has a pair of sidewall portions 3 on both sides of a tread portion 2. The tire 1 according to the present embodiment is for a passenger car. However, the present invention is not limited to such a mode, and may be applied to, for example, tires for a motorcycle and tires for a heavy-duty vehicle.

In the present description, unless otherwise specified, dimensions and the like of components of the tire 1 are measured in a normal state. The normal state is a state where: the tire 1 is mounted on a normal rim and inflated to a normal internal pressure; and no load is applied to the tire 1.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

In the tire 1 according to the present embodiment, the outer surface of at least one of the pair of sidewall portions 3 has a decorative region 5 extending in the tire circumferential direction. In the present embodiment, each of the pair of sidewall portions 3 has a decorative region 5.

The decorative region 5 includes a circumferential pattern line 6 and a radial pattern line 7 formed by a plurality of pattern elements 8. In the circumferential pattern line 6, the plurality of pattern elements 8 are aligned in the tire circumferential direction by being arranged at intervals in the tire circumferential direction. In the radial pattern line 7, the plurality of pattern elements 8 are aligned in the tire radial direction by being arranged at intervals in the tire radial direction. In the decorative region 5, a plurality of circumferential pattern lines 6 are aligned in the tire radial direction, and, in the present embodiment, three or more circumferential pattern lines 6 are aligned. In addition, in the decorative region 5, a plurality of radial pattern lines 7 are aligned in the tire circumferential direction. One pattern element 8 is a component of both the circumferential pattern line 6 and the radial pattern line 7.

In each circumferential pattern line 6, the lengths in the tire circumferential direction of the pattern elements 8 are changed in the tire circumferential direction. In addition, in each radial pattern line 7, the lengths in the tire radial direction of the pattern elements 8 are changed in the tire radial direction.

Each circumferential pattern line 6 changes the degrees of light reflection of the pattern elements 8 in the tire circumferential direction. In addition, each radial pattern line 7 changes the degrees of light reflection of the pattern elements 8 in the tire radial direction. Therefore, the outer surface of the sidewall portion 3 on which the circumferential pattern lines 6 and the radial pattern lines 7 are disposed can reflect light in a complicated manner to effectively prevent projections and recesses from becoming conspicuous (hereinafter, such an effect is sometimes referred to as "camouflaging performance").

Figure 2:
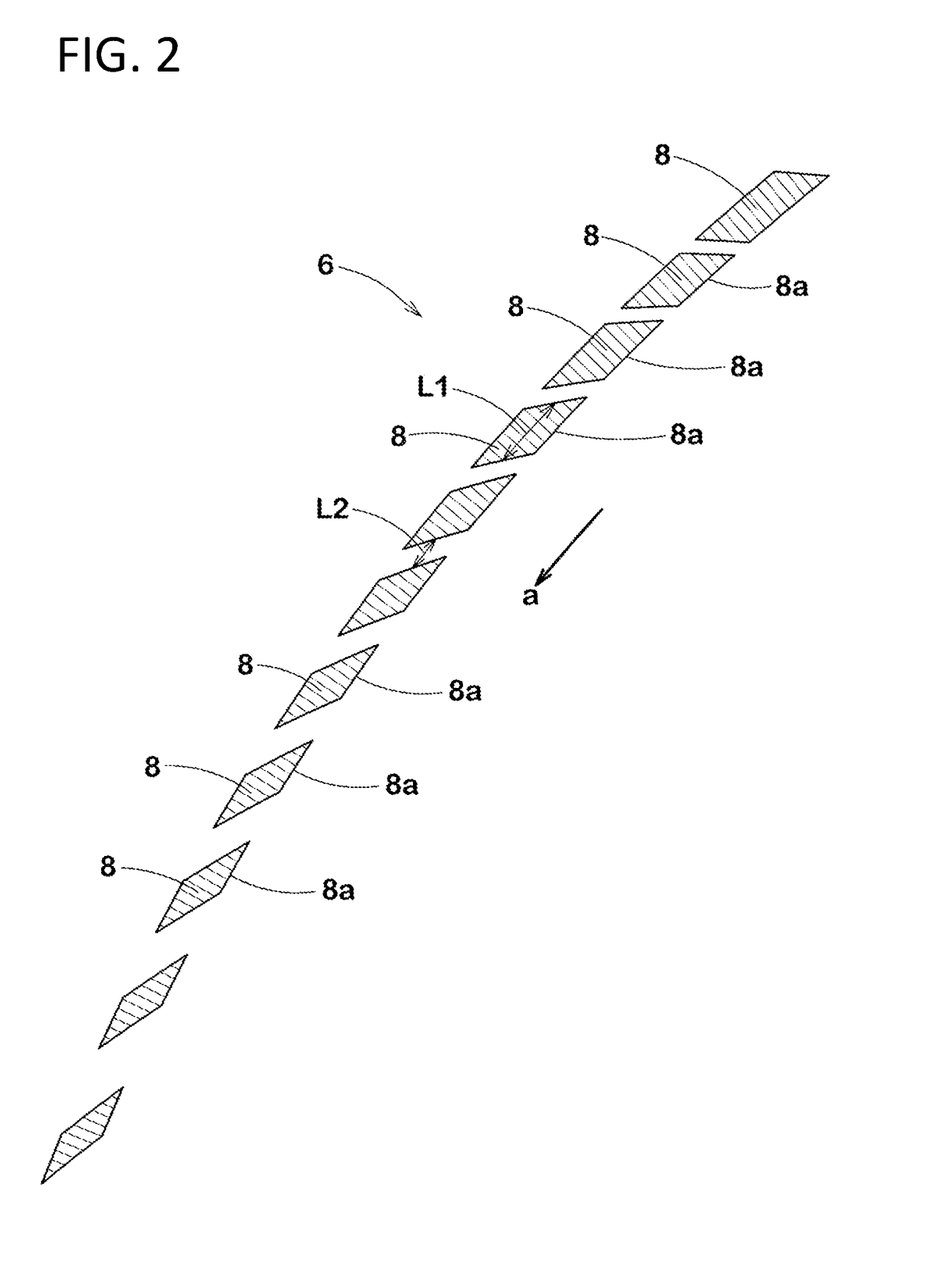
FIG. 2 is an enlarged view of a circumferential pattern line in FIG. 1.

FIG. 2 shows an enlarged view of one circumferential pattern line 6. As shown in FIG. 2, in at least one of the circumferential pattern lines 6, the lengths in the tire circumferential direction of the pattern elements 8 adjacent to each other in the tire circumferential direction are different from each other. As a preferable mode, in the present embodiment, in at least one of the circumferential pattern lines 6, the lengths L1 in the tire circumferential direction of the pattern elements 8 are gradually decreased toward one side a in the tire circumferential direction. Such a circumferential pattern line 6 exhibits excellent camouflaging performance.

In order to further enhance the camouflaging performance, in at least one of the circumferential pattern lines 6, the intervals L2 between the pattern elements 8 are preferably gradually increased toward the one side a in the tire circumferential direction.

Each pattern element 8 includes two first edges 8a extending in the tire circumferential direction. In at least one of the circumferential pattern lines 6, each of the first edges 8a of two pattern elements 8 adjacent to each other is located in a virtual belt having a width smaller than that of the circumferential pattern line 6 and extending along the circumferential pattern line 6. The width of the virtual belt is, for example, not greater than 50% and preferably not greater than 20% of the width of the circumferential pattern line 6.

In the present embodiment, in at least one of the circumferential pattern lines 6, each of the first edges 8a of two pattern elements 8 adjacent to each other is located on substantially the same straight line or on substantially the same curved line extending with a constant curvature. In a more preferable mode, all of the plurality of pattern elements 8 included in the circumferential pattern line 6 are arranged in the above-described relationship. Such arrangement of the pattern elements 8 can suppress problems such as deterioration of the processability and maintainability of a vulcanization mold for molding the outer surface of the sidewall portion 3 and increase of vulcanization molding defects. The "substantially" means that a dimensional error normally included in a rubber molded product and a dimensional error that occurs when the tire is filled with the internal pressure is tolerated, and two first edges 8a that are located on the straight line or the curved line when being displaced by about 1.0 mm are included in the present embodiment.

As shown in FIG. 1, in the present embodiment, each of the plurality of circumferential pattern lines 6 is formed in the above-described mode. Accordingly, further excellent camouflaging performance is achieved.

Each radial pattern line 7 is inclined relative to the tire radial direction. In a preferable mode, of the plurality of radial pattern lines 7 aligned in the tire circumferential direction, the radial pattern lines 7 disposed closer to the one side in the tire circumferential direction have larger angles relative to the tire radial direction. Accordingly, the camouflaging performance is further improved.

Figure 3:
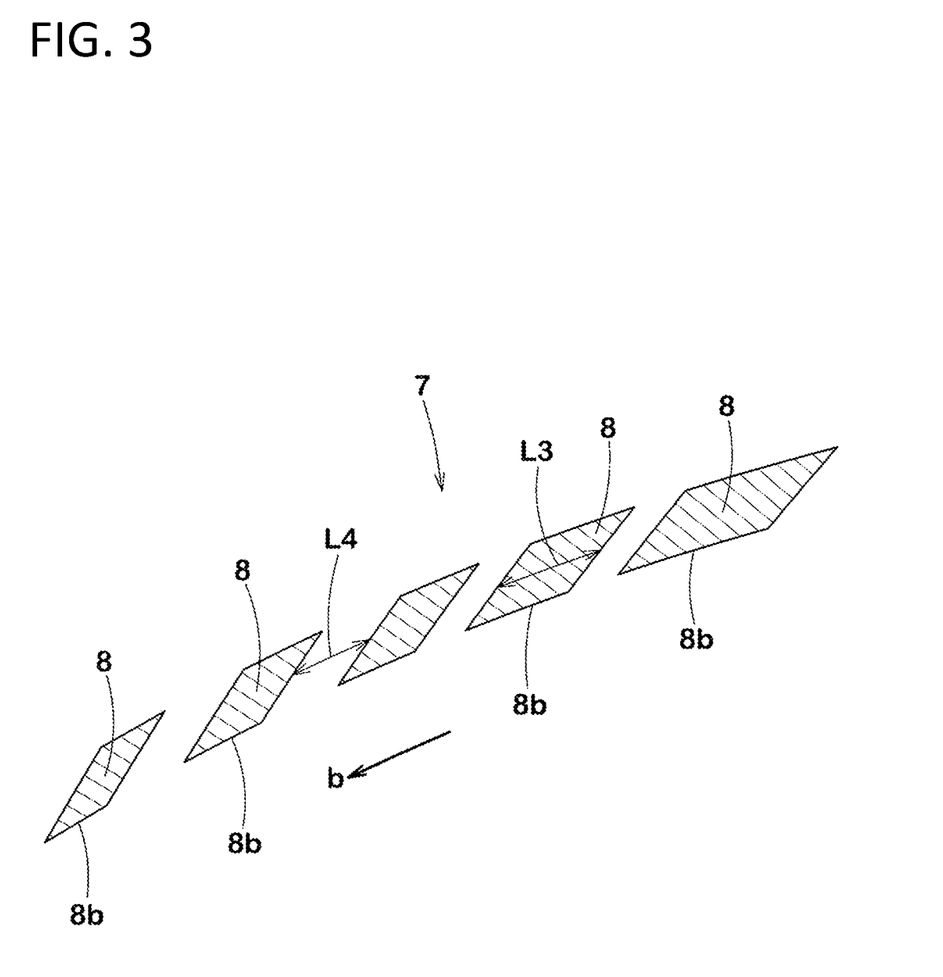
FIG. 3 is an enlarged view of a radial pattern line in FIG. 1.

FIG. 3 shows an enlarged view of one radial pattern line 7. As shown in FIG. 3, in at least one of the radial pattern lines 7, the lengths L3 in the tire radial direction of the pattern elements 8 adjacent to each other in the tire radial direction are different from each other. As a preferable mode, in the present embodiment, in at least one of the radial pattern lines 7, the lengths in the tire radial direction of the pattern elements 8 are gradually decreased toward one side b in the tire radial direction.

In order to further enhance the camouflaging performance, in at least one of the radial pattern lines 7, the intervals L4 between the pattern elements 8 are gradually increased toward the one side b in the tire radial direction.

Each pattern element 8 includes two second edges 8b extending in the tire radial direction. Each of the second edges 8b of two pattern elements 8 adjacent to each other is located in a virtual belt having a width smaller than that of the radial pattern line 7 and extending along the radial pattern line 7. The width of the virtual belt is, for example, not greater than 50% and preferably not greater than 20% of the width of the radial pattern line 7. In the present embodiment, in at least one of the radial pattern lines 7, each of the second edges 8b of two pattern elements 8 adjacent to each other is located on substantially the same straight line or on substantially the same curved line extending with a constant curvature. In a more preferable mode, all of the plurality of pattern elements 8 included in the radial pattern line 7 are arranged in the above-described relationship. Such arrangement of the pattern elements 8 serves to suppress deterioration of the processability and maintainability of the vulcanization mold and vulcanization molding defects.

As shown in FIG. 1, in the present embodiment, each of the plurality of radial pattern lines 7 is formed in the above-described mode. Accordingly, further excellent camouflaging performance is achieved.

At least one pattern element 8 has a parallelogram shape in a plan view. In the present embodiment, each of the plurality of pattern elements 8 has a parallelogram shape. The parallelogram shape of the present embodiment includes not only a shape with linear two sides parallel to each other but also a shape with curved two sides parallel to each other.

The pattern elements 8 have, for example, linear patterns 10 formed on the surfaces thereof. The linear patterns 10 of the present embodiment are inclined in the same direction relative to the tire circumferential direction. In the present embodiment, a non-patterned portion 12 having no linear pattern on the surface thereof is formed between the adjacent pattern elements 8 to make a contrast with the pattern elements 8. The non-patterned portion 12 of the present embodiment is composed of, for example, a smooth surface.

Figure 4:
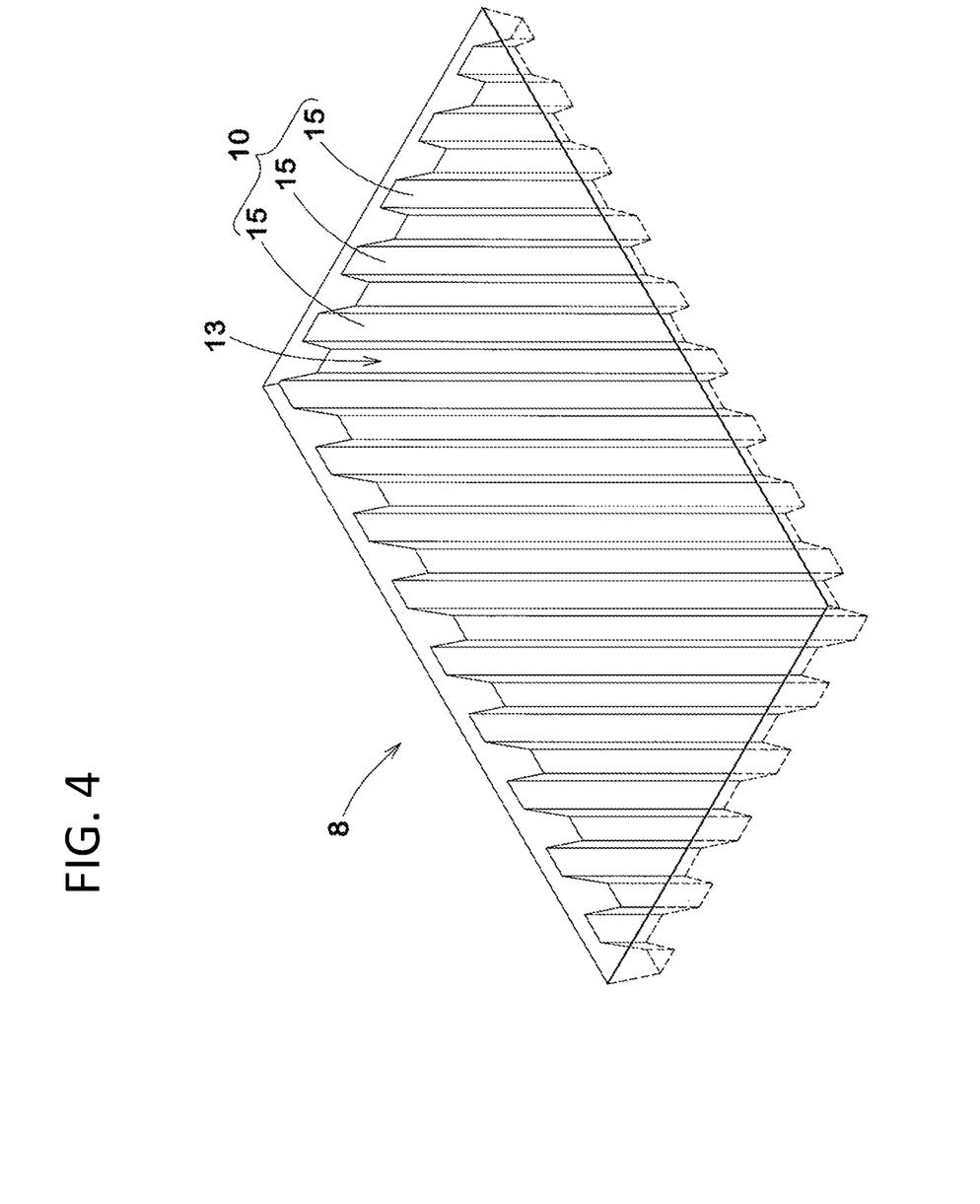
FIG. 4 is an enlarged perspective view of a pattern element in FIG. 1.

FIG. 4 shows an enlarged perspective view of one pattern element 8. As shown in FIG. 4, in each pattern element 8 of the present embodiment, the linear pattern 10 is formed by ridges 15 projecting from the bottom surface of a recess portion 13. A vulcanization mold for forming such pattern elements 8 has excellent air dischargeability during vulcanization molding. Therefore, the pattern elements 8 of the present embodiment serve to suppress vulcanization molding defects such as bareness.

Figure 5:
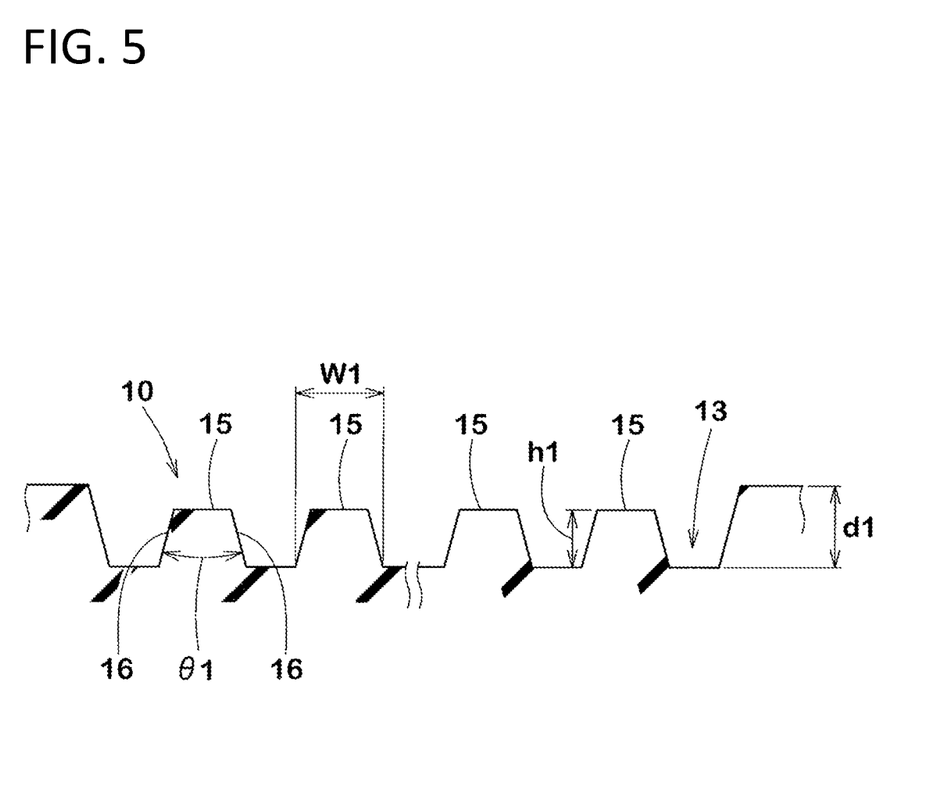
FIG. 5 is a cross-sectional view of a linear pattern in FIG. 4.

FIG. 5 shows a cross-sectional view, of the linear pattern 10, orthogonal to the longitudinal direction of the linear pattern 10. As shown in FIG. 5, the cross-sectional shape of each ridge 15 included in the linear pattern 10 is, for example, a trapezoidal shape. In order to suppress vulcanization molding defects, the height h1 of each ridge 15 is preferably smaller than the depth d1 of the recess portion 13 of the pattern element 8. The height h1 of each ridge 15 is, for example, 40% to 80% of the depth d1 of the recess portion 13.

Each ridge 15 includes two inclined surfaces 16 extending from the bottom surface of the recess portion 13. The angle θ1 between the two inclined surfaces 16 is, for example, 20 to 90°. In addition, the width W1 of each ridge 15 is, for example, 0.2 to 0.6 mm.

Figure 6:
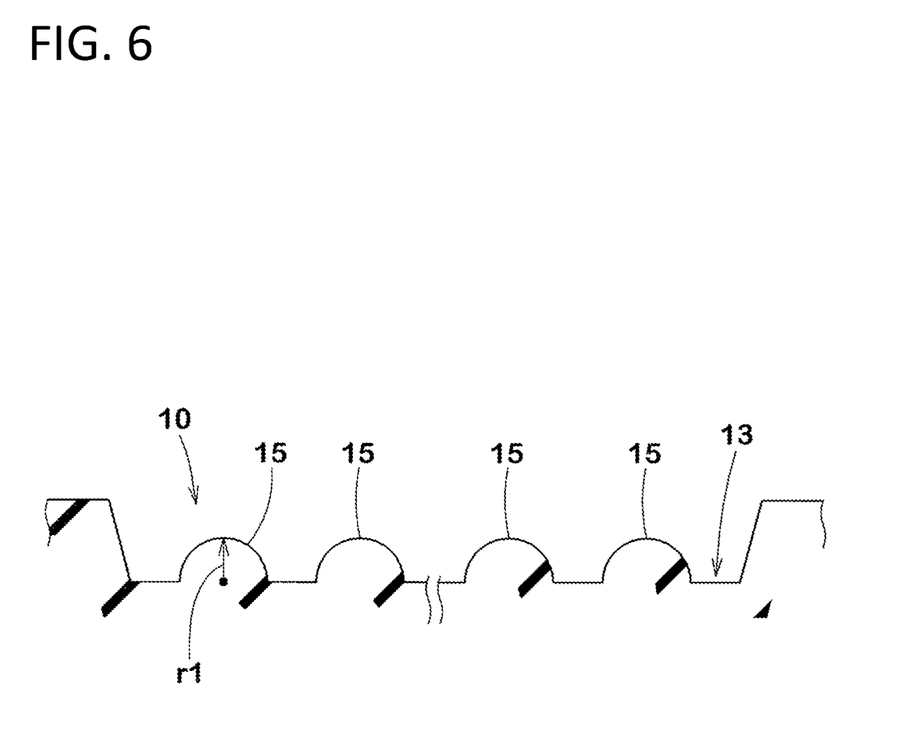
FIG. 6 is a cross-sectional view of a linear pattern according to another embodiment of the present invention.

FIG. 6 shows a cross-sectional view of a linear pattern 10 according to another embodiment. As shown in FIG. 6, the cross-sectional shape of each ridge 15 included in the linear pattern 10 may be, for example, a semicircular shape. In this case, the radius r1 thereof is, for example, 0.4 to 1.2 mm. A vulcanization mold for forming such a linear pattern 10 is less likely to be clogged with dirt in the grooves forming the ridges and thus exhibits excellent maintainability.

Although the particularly preferred embodiments of the present invention have been described in detail above, the present invention is not limited to the above-described embodiments, and various modifications can be made to practice the present invention.

Examples

Tires having a size of 205/55R16 and including the decorative region shown in FIG. 1 on a sidewall portion thereof were produced. As a comparative example, a tire including a decorative region a shown in FIG. 7 on a sidewall portion thereof was produced as a test tire. The decorative region a of the comparative example includes a plurality of projections c projecting from a base surface b on which linear patterns d are disposed. The tire of the comparative example is substantially the same as the tires of examples, except for the configuration of the outer surface of the sidewall portion. Each test tire was tested for camouflaging performance and a rate of occurrence of bareness. The common specifications and the test methods for the test tires are as follows.

Mount rim: 16×6.5 J
Tire internal pressure: 200 kPa
<Camouflaging Performance>

The outer surface of the sidewall portion was visually observed from various directions outdoors in fine weather, and the observer made sensory evaluation for a state of occurrence of projections and recesses on the sidewall portion. The results are indicated as scores with the result of the comparative example being regarded as 100. A higher value indicates that the camouflaging performance is better.

<Rate of Occurrence of Bareness>

Each test tire was produced in a fixed quantity, and the rate of occurrence of bareness on the outer surface of the sidewall portion was measured. The results are indicated as indexes with the rate of occurrence of bareness of the comparative example being regarded as 100. A lower value indicates that the rate of occurrence of bareness is lower and that the result is better.

The results of the tests are shown in Table 1.

TABLE 1

Figure 7:
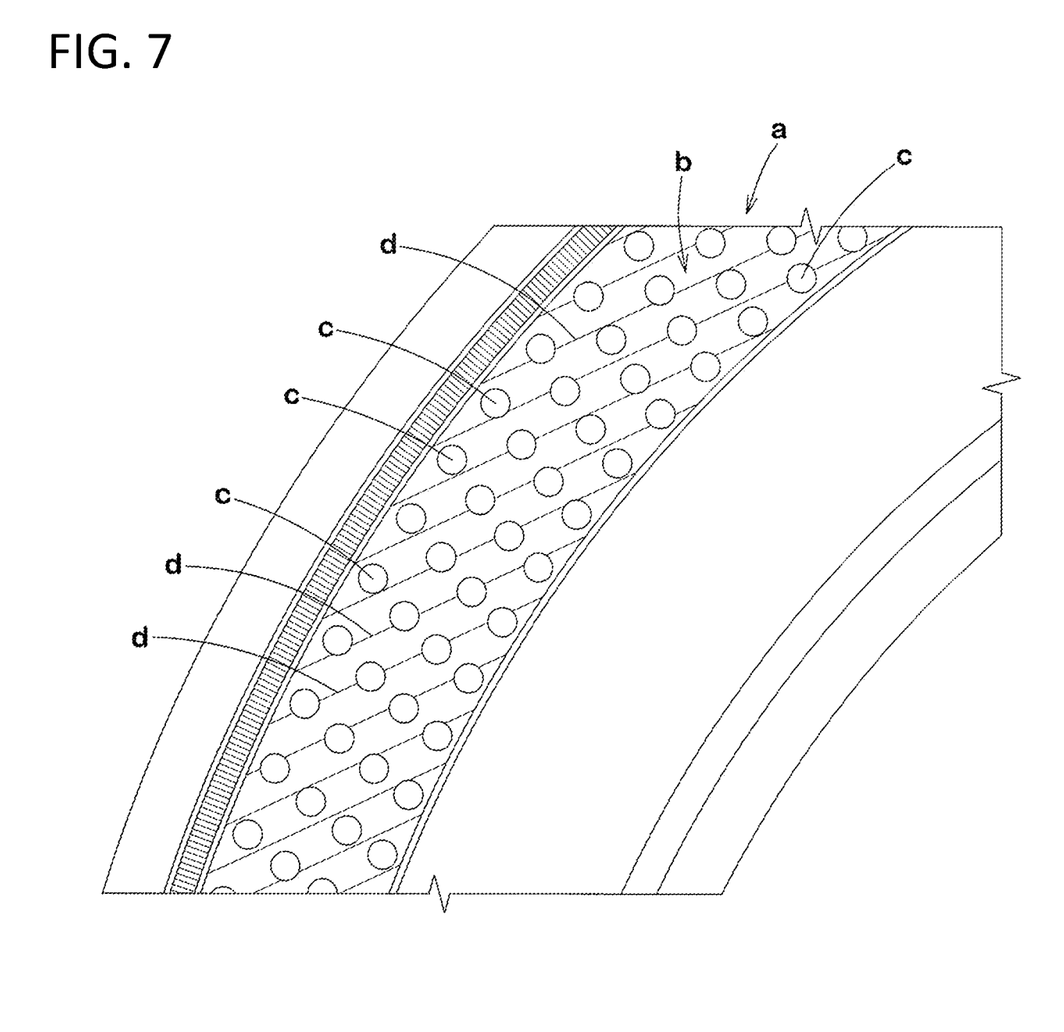
FIG. 7 is an enlarged view of a sidewall portion of a tire of a comparative example.

|  | Comparative Example | Example 1 | Example 2 |
|---|---|---|---|
| Drawing showing sidewall portion | FIG. 7 | FIG. 1 | FIG. 1 |
| Drawing showing cross-section of linear pattern | — | FIG. 4 | FIG. 5 |

TABLE 1-continued

|  | Comparative Example | Example 1 | Example 2 |
|---|---|---|---|
| Camouflaging performance (score) | 100 | 120 | 115 |
| Rate of occurrence of bareness (index) | 100 | 85 | 89 |

As a result of the tests, it was confirmed that the tire of each Example effectively made the projections and recesses on the sidewall portion inconspicuous. In addition, it was confirmed that the tire of each Example suppressed occurrence of bareness.

What is claimed is:

1. A pneumatic tire having a pair of sidewall portions, wherein
an outer surface of at least one of the pair of sidewall portions includes a decorative region extending in a tire circumferential direction,
in the decorative region, a plurality of pattern elements is arranged at intervals in the tire circumferential direction and a tire radial direction, whereby the decorative region includes a plurality of circumferential pattern lines in each of which the pattern elements are aligned in the tire circumferential direction, and a plurality of radial pattern lines in each of which the pattern elements are aligned in the tire radial direction,
the pattern elements each have a parallelogram shape in a plan view, the parallelogram shape consisting of a first pair of opposing sides and a second pair of opposing sides, the sides of the first pair of opposing sides each having a first length and the sides of the second pair of opposing sides each having a second length, such that each pattern element has an aspect ratio based on the first and second lengths of the first and second pairs of opposing sides,
in each of the circumferential pattern lines, lengths in the tire circumferential direction of the pattern elements are changed in the tire circumferential direction,
in each of the radial pattern lines, lengths in the tire radial direction of the pattern elements are changed in the tire radial direction,
in at least one of the circumferential pattern lines, the lengths in the tire circumferential direction of the pattern elements are gradually decreased toward one side in the tire circumferential direction such that the aspect ratio of each of the pattern elements in the at least one of the circumferential pattern lines is different from the aspect ratio of an adjacent one of the pattern elements in the plan view, and
in at least one of the circumferential pattern lines, the intervals between the pattern elements are gradually increased toward the one side in the tire circumferential direction.

2. The pneumatic tire according to claim 1, wherein, in at least one of the circumferential pattern lines, the lengths in the tire circumferential direction of the pattern elements adjacent to each other in the tire circumferential direction are different from each other.

3. The pneumatic tire according to claim 1, wherein, in at least one of the radial pattern lines, the lengths in the tire radial direction of the pattern elements adjacent to each other in the tire radial direction are different from each other.

4. The pneumatic tire according to claim 1, wherein, in at least one of the radial pattern lines, the lengths in the tire radial direction of the pattern elements are gradually decreased toward one side in the tire radial direction.

5. The pneumatic tire according to claim 1, wherein, in at least one of the radial pattern lines, the intervals between the pattern elements are gradually increased toward one side in the tire radial direction.

6. The pneumatic tire according to claim 1, wherein a plurality of linear patterns is formed on surfaces of the pattern elements.

7. The pneumatic tire according to claim 6, wherein the linear patterns are inclined in the same direction relative to the tire circumferential direction.

8. The pneumatic tire according to claim 6, wherein the linear pattern is formed by ridges projecting from the bottom surface of a recess portion.

9. The pneumatic tire according to claim 8, wherein a height of each ridge is smaller than a depth of the recess portion of the pattern element.

10. The pneumatic tire according to claim 9, wherein the height of each ridge is 40% to 80% of the depth of the recess portion.

11. The pneumatic tire according to claim 1, wherein, in the decorative region, a non-patterned portion having no linear pattern on a surface thereof is formed between the pattern elements adjacent to each other.

12. The pneumatic tire according to claim 1, wherein a number of the circumferential pattern lines provided is three or more.

13. The pneumatic tire according to claim 1, wherein each of the radial pattern lines is inclined relative to the tire radial direction.

14. The pneumatic tire according to claim 13, wherein the plurality of radial pattern lines are aligned in the tire circumferential direction,
wherein the radial pattern lines disposed closer to one side in the tire circumferential direction have larger angles relative to the tire radial direction.

15. The pneumatic tire according to claim 1, wherein each pattern element includes two first edges extending in the tire circumferential direction,
wherein each of the respective first edges of two pattern elements adjacent to each other in the circumferential direction is located on substantially a same straight line or on substantially a same curved line extending with a constant curvature.

16. The pneumatic tire according to claim 1, wherein each pattern element includes two second edges extending in the tire radial direction,
wherein each of the respective second edges of two pattern elements adjacent to each other in the tire radial direction is located on substantially a same straight line or on substantially a same curved line extending with a constant curvature.

17. A pneumatic tire having a pair of sidewall portions, wherein
an outer surface of at least one of the pair of sidewall portions includes a decorative region extending parallel to a tire circumferential direction,
in the decorative region, a plurality of pattern elements is arranged at intervals parallel to the tire circumferential direction and in a tire radial direction, whereby the decorative region includes a plurality of circumferential pattern lines in each of which the pattern elements are aligned parallel to the tire circumferential direction, and a plurality of radial pattern lines in each of which the pattern elements are aligned in the tire radial direction, the pattern elements each have an external shape in a plan view, the external shape comprising a first pair of opposing sides and a second pair of opposing sides, the sides of the first pair of opposing sides each having a first length and the sides of the second pair of opposing sides each having a second length, such that each pattern element has an aspect ratio based on the first and second lengths of the first and second pairs of opposing sides, in each of the circumferential pattern lines, lengths parallel to the tire circumferential direction of the pattern elements are changed in the tire circumferential direction, in each of the radial pattern lines, lengths in the tire radial direction of the pattern elements are changed in the tire radial direction, in at least one of the circumferential pattern lines, the lengths parallel to the tire circumferential direction of the pattern elements are gradually decreased toward one side in the tire circumferential direction such that the aspect ratio of each of the pattern elements in the at least one of the circumferential pattern lines is different from the aspect ratio of an adjacent one of the pattern elements in the plan view, and in at least one of the circumferential pattern lines, the intervals between the pattern elements are gradually increased toward the one side in the tire circumferential direction.

18. A pneumatic tire having a pair of sidewall portions, wherein an outer surface of at least one of the pair of sidewall portions includes a decorative region extending in a tire circumferential direction, in the decorative region, a plurality of pattern elements is arranged at intervals in the tire circumferential direction and a tire radial direction, whereby the decorative region includes a plurality of circumferential pattern lines in each of which the pattern elements are aligned in the tire circumferential direction, and a plurality of radial pattern lines in each of which the pattern elements are aligned in the tire radial direction, the pattern elements each have a parallelogram shape in a plan view, the parallelogram shape consisting of a first pair of opposing sides and a second pair of opposing sides, the sides of the first pair of opposing sides each having a first length and the sides of the second pair of opposing sides each having a second length, such that each pattern element has an aspect ratio based on the first and second lengths of the first and second pairs of opposing sides, in each of the circumferential pattern lines, lengths in the tire circumferential direction of the pattern elements are changed in the tire circumferential direction such that the aspect ratio of each of the pattern elements in each of the circumferential pattern lines is different from the aspect ratio of an adjacent one of the pattern elements in the plan view, in each of the radial pattern lines, lengths in the tire radial direction of the pattern elements are changed in the tire radial direction such that the aspect ratio of each of the pattern elements in each of the radial pattern lines is different from the aspect ratio of an adjacent one of the pattern elements in the plan view.

* * * * *